(12) United States Patent
Connelly et al.

(10) Patent No.: US 11,813,581 B2
(45) Date of Patent: Nov. 14, 2023

(54) METHOD AND ADAPTER FOR CONVEYING PLURAL LIQUID STREAMS

(71) Applicant: 3M INNOVATIVE PROPERTIES COMPANY, St. Paul, MN (US)

(72) Inventors: Patrick R. Connelly, Mendota Heights, MN (US); Marc A. Egeland, St. Paul, MN (US); Gregory P. Moriarty, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 339 days.

(21) Appl. No.: 16/629,744

(22) PCT Filed: Jul. 6, 2018

(86) PCT No.: PCT/IB2018/055019
§ 371 (c)(1),
(2) Date: Jan. 9, 2020

(87) PCT Pub. No.: WO2019/012399
PCT Pub. Date: Jan. 17, 2019

(65) Prior Publication Data
US 2020/0139320 A1    May 7, 2020

Related U.S. Application Data

(60) Provisional application No. 62/532,391, filed on Jul. 14, 2017.

(51) Int. Cl.
*B05C 17/005* (2006.01)
*B01F 33/501* (2022.01)
(Continued)

(52) U.S. Cl.
CPC ........ *B01F 33/50112* (2022.01); *B01F 25/42* (2022.01); *B01F 35/7174* (2022.01);
(Continued)

(58) Field of Classification Search
CPC  B01F 33/50112; B01F 25/42; B01F 35/7174; B01F 2101/36; B01F 35/717;
(Continued)

(56) References Cited

U.S. PATENT DOCUMENTS 715,052 A    12/1902  Goodwin
2,072,516 A    3/1937  Ferenci
(Continued)

FOREIGN PATENT DOCUMENTS

CN    1220901    6/1999
CN    201270776    7/2009
(Continued)

OTHER PUBLICATIONS

International Search Report for PCT International Application No. PCT/IB18/55019, dated Oct. 29, 2018, 2 pages.
(Continued)

*Primary Examiner* — Rick K Chang
(74) *Attorney, Agent, or Firm* — Melissa E. Buss

(57) ABSTRACT

A method and an adapter for improving the efficiency of a static mixer being used to mix reactive fluids such as epoxy adhesives. This allows either a small static mixer to be employed, or a smaller purge flow during dispensing operations.

2 Claims, 3 Drawing Sheets

(51) Int. Cl.
  *B33Y 10/00* (2015.01)
  *B33Y 80/00* (2015.01)
  *B65D 81/32* (2006.01)
  *B01F 25/42* (2022.01)
  *B01F 35/71* (2022.01)
  *B01F 101/36* (2022.01)

(52) U.S. Cl.
  CPC ........ *B05C 17/00553* (2013.01); *B33Y 10/00* (2014.12); *B33Y 80/00* (2014.12); *B65D 81/325* (2013.01); *B01F 2101/36* (2022.01)

(58) Field of Classification Search
  CPC ... B05C 17/00553; B33Y 10/00; B33Y 80/00; B65D 81/325
  See application file for complete search history.

(56) References Cited

U.S. PATENT DOCUMENTS

| | | |
|---|---|---|
| 2,230,770 A | 2/1941 | Van Almelo |
| 2,290,885 A | 7/1942 | Lehmberg |
| 2,378,929 A | 6/1945 | Joyce |
| 2,507,447 A | 5/1950 | Joie |
| 2,895,472 A | 7/1959 | Matheson |
| 3,038,470 A | 6/1962 | Campbell |
| 3,427,002 A | 2/1969 | Wilding |
| 3,552,554 A | 1/1971 | Olgard |
| 3,603,315 A | 9/1971 | Becker, III |
| 3,785,779 A | 1/1974 | Li |
| 3,834,384 A | 9/1974 | Raines |
| 3,888,246 A | 6/1975 | Lauer |
| 3,890,966 A | 6/1975 | Aspelin et al. |
| 3,971,369 A | 7/1976 | Aspelin |
| 3,971,373 A | 7/1976 | Braun |
| 3,974,829 A | 8/1976 | Tate, Jr. |
| 3,980,102 A | 9/1976 | Kiesow |
| 3,985,132 A | 10/1976 | Boyce |
| 4,013,816 A | 3/1977 | Sabee |
| 4,037,593 A | 7/1977 | Tate, Jr. |
| 4,077,404 A | 3/1978 | Elam |
| 4,090,510 A | 5/1978 | Segersten |
| 4,100,324 A | 7/1978 | Anderson |
| 4,118,531 A | 10/1978 | Hauser |
| 4,156,438 A | 5/1979 | Kiesow |
| 4,215,682 A | 8/1980 | Kubik |
| 4,319,567 A | 3/1982 | Magidson |
| 4,375,718 A | 3/1983 | Wadsworth |
| RE31,285 E | 6/1983 | Van Turnhout |
| 4,417,575 A | 11/1983 | Hilton |
| 4,419,993 A | 12/1983 | Petersen |
| 4,419,994 A | 12/1983 | Hilton |
| 4,429,001 A | 1/1984 | Kolpin |
| 4,520,509 A | 6/1985 | Ward |
| 4,536,440 A | 8/1985 | Berg |
| 4,538,920 A | 9/1985 | Drake |
| 4,588,537 A | 5/1986 | Klasse |
| 4,592,815 A | 6/1986 | Nakao |
| 4,630,604 A | 12/1986 | Montesi |
| 4,635,628 A | 1/1987 | Hubbard |
| 4,641,645 A | 2/1987 | Tayebi |
| 4,688,566 A | 8/1987 | Boyce |
| 4,717,515 A | 1/1988 | Forsyth |
| 4,719,090 A | 1/1988 | Masaki |
| 4,790,306 A | 12/1988 | Braun |
| 4,798,850 A | 1/1989 | Brown |
| 4,807,619 A | 2/1989 | Dyrud |
| 4,827,924 A | 5/1989 | Japuntich |
| 4,850,347 A | 7/1989 | Skov |
| 4,873,972 A | 10/1989 | Magidson |
| 4,930,161 A | 6/1990 | Cohen |
| 4,934,362 A | 6/1990 | Braun |
| 4,971,052 A | 11/1990 | Edwards |
| 4,974,586 A | 12/1990 | Wandel |
| 4,981,134 A | 1/1991 | Courtney |
| 5,035,239 A | 7/1991 | Edwards |
| 5,062,421 A | 11/1991 | Burns |
| 5,099,897 A | 3/1992 | Curtin |
| 5,103,337 A | 4/1992 | Schrenk |
| 5,217,794 A | 6/1993 | Schrenk |
| 5,237,986 A | 8/1993 | Seppala |
| 5,307,796 A | 5/1994 | Kronzer |
| 5,325,892 A | 7/1994 | Japuntich |
| 5,360,659 A | 11/1994 | Arends |
| 5,393,429 A | 2/1995 | Nakayama |
| 5,394,568 A | 3/1995 | Brostrom |
| 5,419,318 A | 5/1995 | Tayebi |
| 5,446,925 A | 9/1995 | Baker |
| 5,464,010 A | 11/1995 | Byram |
| 5,481,763 A | 1/1996 | Brostrom |
| 5,486,949 A | 1/1996 | Schrenk |
| 5,496,507 A | 3/1996 | Angadjivand |
| 5,505,197 A | 4/1996 | Scholey |
| 5,509,436 A | 4/1996 | Japuntich |
| 5,558,089 A | 9/1996 | Castiglione |
| 5,561,863 A | 10/1996 | Carlson, II |
| 5,617,849 A | 4/1997 | Springett |
| 5,628,308 A | 5/1997 | Harges, Jr |
| 5,656,368 A | 8/1997 | Braun |
| 5,682,879 A | 11/1997 | Bowers |
| 5,687,767 A | 11/1997 | Bowers |
| 5,699,791 A | 12/1997 | Sukiennik |
| 5,701,893 A | 12/1997 | Kern |
| D389,239 S | 1/1998 | Scholey |
| 5,704,063 A | 1/1998 | Tilden |
| 5,717,991 A | 2/1998 | Nozaki |
| 5,724,677 A | 3/1998 | Bryant |
| 5,724,964 A | 3/1998 | Brunson |
| 5,804,295 A | 9/1998 | Braun |
| 5,813,398 A | 9/1998 | Baird |
| 5,819,731 A | 10/1998 | Dyrud |
| 5,825,543 A | 10/1998 | Ouderkirk |
| 5,829,433 A | 11/1998 | Shigematsu |
| 5,865,172 A | 2/1999 | Butler |
| 5,882,774 A | 3/1999 | Jonza |
| 5,884,336 A | 3/1999 | Stout |
| 5,906,507 A | 5/1999 | Howard |
| 5,908,598 A | 6/1999 | Rousseau |
| 5,924,420 A | 7/1999 | Reischel |
| 5,927,280 A | 7/1999 | Miyake |
| D412,573 S | 8/1999 | Castiglione |
| D416,323 S | 11/1999 | Henderson |
| 6,026,511 A | 2/2000 | Baumann |
| 6,041,782 A | 3/2000 | Angadjivand |
| 6,045,894 A | 4/2000 | Jonza |
| 6,047,698 A | 4/2000 | Magidson |
| D424,688 S | 5/2000 | Bryant |
| 6,062,220 A | 5/2000 | Whitaker et al. |
| 6,062,221 A | 5/2000 | Brostrom |
| 6,095,143 A | 8/2000 | Dyrud |
| 6,096,247 A | 8/2000 | Ulsh |
| 6,098,201 A | 8/2000 | Boros, Sr. |
| 6,102,039 A | 8/2000 | Springett |
| 6,102,040 A | 8/2000 | Tayebi |
| 6,116,236 A | 9/2000 | Wyss |
| 6,119,692 A | 9/2000 | Byram |
| 6,123,077 A | 9/2000 | Bostock |
| D431,647 S | 10/2000 | Henderson |
| 6,125,849 A | 10/2000 | Williams |
| 6,135,631 A | 10/2000 | Keller |
| 6,148,817 A | 11/2000 | Bryant |
| 6,157,490 A | 12/2000 | Wheatley |
| 6,173,712 B1 | 1/2001 | Brunson |
| 6,179,948 B1 | 1/2001 | Merrill |
| 6,186,140 B1 | 2/2001 | Hoague |
| 6,207,260 B1 | 3/2001 | Wheatley |
| 6,234,171 B1 | 5/2001 | Springett |
| D443,927 S | 6/2001 | Chen |
| 6,257,235 B1 | 7/2001 | Bowen |
| 6,277,178 B1 | 8/2001 | Holmquist-Brown |
| D448,472 S | 9/2001 | Chen |
| 6,332,465 B1 | 12/2001 | Xue |
| 6,336,459 B1 | 1/2002 | Miyake |
| 6,352,761 B1 | 3/2002 | Hebrink |

(56) References Cited

U.S. PATENT DOCUMENTS

| | | | |
|---|---|---|---|
| 6,354,296 B1 | 3/2002 | Baumann | |
| 6,375,886 B1 | 4/2002 | Angadjivand | |
| 6,391,429 B1 | 5/2002 | Senkus | |
| 6,394,090 B1 | 5/2002 | Cheng | |
| 6,397,458 B1 | 6/2002 | Jones | |
| 6,398,847 B1 | 6/2002 | Jones | |
| 6,406,657 B1 | 6/2002 | Eitzman | |
| 6,409,806 B1 | 6/2002 | Jones | |
| 6,454,986 B1 | 9/2002 | Eitzman | |
| D464,725 S | 10/2002 | Petherbridge | |
| 6,457,473 B1 | 10/2002 | Brostrom | |
| 6,460,539 B1 | 10/2002 | Japuntich | |
| 6,475,182 B1 * | 11/2002 | Hnojewyj | A61M 25/0662 604/82 |
| 6,484,722 B2 | 11/2002 | Bostock | |
| 6,492,286 B1 | 12/2002 | Berrigan | |
| RE37,974 E | 2/2003 | Bowers | |
| 6,520,181 B2 | 2/2003 | Baumann et al. | |
| 6,523,992 B1 | 2/2003 | Bublewitz | |
| 6,531,230 B1 | 3/2003 | Weber | |
| 6,536,434 B1 | 3/2003 | Bostock | |
| 6,561,257 B2 | 5/2003 | Huang | |
| 6,568,392 B1 | 5/2003 | Bostock | |
| 6,584,976 B2 | 7/2003 | Japuntich | |
| 6,593,980 B2 | 7/2003 | Lee | |
| 6,604,524 B1 | 8/2003 | Curran | |
| 6,705,317 B2 | 3/2004 | Castiglione | |
| 6,715,489 B2 | 4/2004 | Bostock | |
| 6,722,366 B2 | 4/2004 | Bostock | |
| 6,729,332 B1 | 5/2004 | Castiglione | |
| 6,743,464 B1 | 6/2004 | Insley | |
| 6,754,909 B1 | 6/2004 | Samelian | |
| 6,722,759 B2 | 8/2004 | Lee | |
| 6,772,759 B2 | 8/2004 | Lee | |
| 6,783,349 B2 | 8/2004 | Neavin | |
| 6,783,574 B1 | 8/2004 | Angadjivand | |
| 6,797,366 B2 | 9/2004 | Hanson | |
| 6,823,868 B1 | 11/2004 | Begum | |
| 6,824,718 B2 | 11/2004 | Eitzman | |
| 6,827,764 B2 | 12/2004 | Springett | |
| 6,843,248 B2 | 1/2005 | Japuntich | |
| 6,854,463 B2 | 2/2005 | Japuntich | |
| 6,857,428 B2 | 2/2005 | Thornton | |
| 6,883,518 B2 | 4/2005 | Mittelstadt | |
| 6,923,182 B2 | 8/2005 | Angadjivand | |
| 6,939,499 B2 | 9/2005 | Merrill | |
| 6,948,499 B2 | 9/2005 | Griesbach, III | |
| 6,959,709 B2 | 11/2005 | Curran | |
| 6,978,782 B2 | 12/2005 | Tayebi | |
| 6,988,500 B1 | 1/2006 | Cox | |
| 6,995,665 B2 | 2/2006 | Appelt | |
| 7,007,695 B2 | 3/2006 | Curran | |
| 7,013,895 B2 | 3/2006 | Martin | |
| 7,019,905 B2 | 3/2006 | Weber | |
| 7,028,689 B2 | 4/2006 | Martin | |
| 7,036,507 B2 | 5/2006 | Jensen | |
| 7,057,816 B1 | 6/2006 | Allen | |
| 7,069,930 B2 | 7/2006 | Bostock | |
| 7,069,931 B2 | 7/2006 | Curran | |
| 7,117,868 B1 | 10/2006 | Japuntich | |
| 7,131,442 B1 | 11/2006 | Kronzer | |
| 7,171,967 B2 | 2/2007 | Brunell | |
| 7,185,653 B2 | 3/2007 | Lee | |
| 7,188,622 B2 | 3/2007 | Martin | |
| 7,195,015 B2 | 3/2007 | Kuriyama | |
| D542,407 S | 5/2007 | Stallard | |
| 7,256,936 B2 | 8/2007 | Hebrink | |
| 7,290,545 B2 | 11/2007 | Kleman | |
| 7,302,951 B2 | 12/2007 | Mittelstadt | |
| 7,311,104 B2 | 12/2007 | Japuntich | |
| 7,316,558 B2 | 1/2008 | Merrill | |
| D567,365 S | 4/2008 | Brunell | |
| D567,937 S | 4/2008 | Gerson | |
| 7,428,903 B1 | 9/2008 | Japuntich | |
| 7,493,900 B1 | 2/2009 | Japuntich | |
| 7,503,326 B2 | 3/2009 | Martin | |
| 7,559,975 B2 | 7/2009 | Gramme | |
| 7,677,248 B2 | 3/2010 | Gerson | |
| 7,686,018 B2 | 3/2010 | Cerbini | |
| 7,766,015 B2 | 8/2010 | Harold | |
| 7,836,886 B2 | 11/2010 | McDonald | |
| 7,849,856 B2 | 12/2010 | Mittelstadt | |
| 7,858,163 B2 | 12/2010 | Angadjivand | |
| 7,905,973 B2 | 3/2011 | Stelter | |
| 7,909,502 B2 | 3/2011 | Ehrfeld | |
| D637,711 S | 5/2011 | Facer | |
| 7,963,284 B2 | 6/2011 | Thornton | |
| 8,029,723 B2 | 10/2011 | Angadjivand | |
| 8,061,356 B2 | 11/2011 | Bowen | |
| 8,066,006 B2 | 11/2011 | Daugaard | |
| 8,074,660 B2 | 12/2011 | Duffy | |
| 8,091,550 B2 | 1/2012 | Steindorf | |
| 8,118,026 B2 | 2/2012 | Gebrewold | |
| 8,146,594 B2 | 4/2012 | Bostock | |
| 8,171,933 B2 | 5/2012 | Xue | |
| 8,225,792 B2 | 7/2012 | Kuriyama | |
| 8,276,586 B2 | 10/2012 | Hustveit | |
| 8,328,553 B2 | 12/2012 | Broyles | |
| 8,342,180 B2 | 1/2013 | Martin | |
| 8,360,067 B2 | 1/2013 | Duffy | |
| D676,527 S | 2/2013 | Xue | |
| 8,365,771 B2 | 2/2013 | Xue | |
| 8,375,950 B2 | 2/2013 | Bostock | |
| 8,430,100 B2 | 4/2013 | Reese | |
| 8,439,038 B2 | 5/2013 | Steindorf | |
| 8,496,005 B2 | 7/2013 | McDonald | |
| 8,512,434 B2 | 8/2013 | Stelter | |
| 8,561,845 B2 | 10/2013 | Reidt et al. | |
| 8,573,217 B2 | 11/2013 | Todd | |
| 8,578,515 B1 | 11/2013 | Petersen | |
| 8,580,182 B2 | 11/2013 | Angadjivand | |
| 8,622,059 B2 | 1/2014 | Kleman | |
| 8,640,704 B2 | 2/2014 | Spoo | |
| 8,646,449 B2 | 2/2014 | Bowsher | |
| 8,757,156 B2 | 6/2014 | Martin | |
| 8,792,165 B2 | 7/2014 | Merrill | |
| 8,839,815 B2 | 9/2014 | Young | |
| 8,879,151 B2 | 11/2014 | Merrill | |
| 8,910,663 B2 | 12/2014 | Kern | |
| 8,975,011 B2 | 3/2015 | Dunn | |
| 8,975,012 B2 | 3/2015 | Dunn | |
| 8,982,462 B2 | 3/2015 | Merrill | |
| 9,012,013 B2 | 4/2015 | Duffy | |
| 9,019,607 B2 | 4/2015 | Merrill | |
| 9,079,335 B2 | 7/2015 | Schuler | |
| 9,081,147 B2 | 7/2015 | Merrill | |
| 9,097,858 B2 | 8/2015 | Merrill | |
| 9,101,956 B2 | 8/2015 | Merrill | |
| 9,211,168 B2 | 12/2015 | Broyles et al. | |
| D746,974 S | 1/2016 | Ylitalo | |
| 9,247,775 B2 | 2/2016 | Suzuki | |
| 9,289,568 B2 | 3/2016 | Dhuper | |
| 9,291,757 B2 | 3/2016 | Merrill | |
| 9,375,544 B2 | 6/2016 | Todd | |
| 9,423,545 B2 | 8/2016 | Merrill | |
| 9,446,327 B2 | 9/2016 | Lee | |
| 9,498,592 B2 | 11/2016 | Dhuper | |
| 9,616,256 B2 | 4/2017 | McDonald | |
| 9,642,403 B2 | 5/2017 | Welch | |
| 9,651,725 B2 | 5/2017 | Merrill | |
| 9,651,726 B2 | 5/2017 | Merrill | |
| 9,770,057 B2 | 9/2017 | Duffy | |
| 9,770,058 B2 | 9/2017 | Angadjivand | |
| 9,770,611 B2 | 9/2017 | Facer | |
| 9,810,930 B2 | 11/2017 | Merrill | |
| 9,901,419 B2 | 2/2018 | Müller | |
| 9,907,922 B2 | 3/2018 | Stephenson | |
| 9,907,923 B2 | 3/2018 | Stephenson | |
| 9,939,560 B2 | 4/2018 | Merrill | |
| 9,950,130 B2 | 4/2018 | Stephenson | |
| 9,964,677 B2 | 5/2018 | Merrill | |
| 10,034,992 B2 | 7/2018 | Schnell | |
| 10,052,451 B2 | 8/2018 | Dhuper | |
| 10,137,321 B2 | 11/2018 | Martin | |

(56) References Cited

U.S. PATENT DOCUMENTS

| | | |
|---|---|---|
| 10,182,603 B2 | 1/2019 | Duffy |
| 10,245,405 B2 | 4/2019 | Todd |
| 10,525,228 B2 | 1/2020 | Dhuper |
| 10,602,785 B2 | 3/2020 | Duffy |
| 10,786,333 B2 | 9/2020 | Boehm |
| 10,827,787 B2 | 11/2020 | Facer |
| 10,863,784 B2 | 12/2020 | Abdulqader |
| 10,905,903 B2 | 2/2021 | Martin |
| 10,964,155 B2 | 3/2021 | Stephenson |
| 11,065,412 B2 | 7/2021 | Stephenson |
| 11,083,916 B2 | 8/2021 | Duffy |
| 11,116,998 B2 | 9/2021 | Duffy |
| 11,213,080 B2 | 1/2022 | Henderson |
| 11,406,495 B2 | 8/2022 | Delmotte |
| 11,406,945 B2 | 8/2022 | Delmotte |
| 2001/0015205 A1 | 8/2001 | Bostock |
| 2001/0055078 A1 | 12/2001 | Lee |
| 2002/0056450 A1 | 5/2002 | Lee |
| 2002/0195108 A1 | 12/2002 | Mittelstadt |
| 2002/0195109 A1 | 12/2002 | Mittelstadt |
| 2003/0084902 A1 | 5/2003 | Japuntich |
| 2004/0040562 A1 | 3/2004 | Brunell |
| 2004/0055078 A1 | 3/2004 | Griesbach, III |
| 2004/0055605 A1 | 3/2004 | Griesbach, III |
| 2004/0226563 A1 | 11/2004 | Xu |
| 2004/0255947 A1 | 12/2004 | Martin |
| 2004/0261795 A1 | 12/2004 | Brunell |
| 2004/0262223 A1 | 12/2004 | Strook |
| 2005/0001728 A1 | 1/2005 | Appelt |
| 2005/0051172 A1 | 3/2005 | Lee |
| 2005/0066637 A1 | 3/2005 | Gramme |
| 2005/0098180 A1 | 5/2005 | Lien |
| 2005/0133034 A1 | 6/2005 | Jensen |
| 2005/0252839 A1 | 11/2005 | Curran |
| 2006/0174890 A1 | 8/2006 | Cheng |
| 2006/0180152 A1 | 8/2006 | Bostock |
| 2007/0044803 A1 | 3/2007 | Xue |
| 2007/0068529 A1 | 3/2007 | Kalatoor |
| 2007/0078528 A1 | 4/2007 | Anke |
| 2007/0107734 A1 | 5/2007 | Brunell |
| 2007/0119459 A1 | 5/2007 | Japuntich |
| 2007/0144524 A1 | 6/2007 | Martin |
| 2007/0157932 A1 | 7/2007 | Cerbini |
| 2007/0175477 A1 | 8/2007 | Baggett |
| 2007/0272248 A1 | 11/2007 | Lin |
| 2007/0283964 A1 | 12/2007 | Gorman |
| 2008/0011303 A1 | 1/2008 | Angadjivand |
| 2008/0026172 A1 | 1/2008 | Stelter |
| 2008/0026173 A1 | 1/2008 | Angadjivand |
| 2008/0044811 A1 | 2/2008 | Haugland et al. |
| 2008/0092909 A1 | 4/2008 | Hahne |
| 2008/0105261 A1 | 5/2008 | Harold |
| 2008/0174619 A1 | 7/2008 | Katsumura |
| 2008/0178884 A1 | 7/2008 | Gerson |
| 2008/0271737 A1 | 11/2008 | Facer |
| 2008/0271739 A1 | 11/2008 | Facer |
| 2008/0271740 A1 | 11/2008 | Gloag |
| 2009/0044812 A1 | 2/2009 | Welchel |
| 2009/0078264 A1 | 3/2009 | Martin |
| 2009/0078265 A1 | 3/2009 | Gebrewold |
| 2009/0133700 A1 | 5/2009 | Martin |
| 2009/0211582 A1 | 8/2009 | Reese |
| 2009/0235934 A1 | 9/2009 | Martin |
| 2009/0255542 A1 | 10/2009 | Ugai |
| 2009/0298010 A1 | 12/2009 | Broyles et al. |
| 2010/0065058 A1 | 3/2010 | Ungar |
| 2010/0083967 A1 | 4/2010 | Kuriyama |
| 2010/0126510 A1 | 5/2010 | Gerson |
| 2010/0132713 A1 | 6/2010 | Gerson |
| 2010/0154804 A1 | 6/2010 | Duffy |
| 2010/0154805 A1 | 6/2010 | Duffy |
| 2010/0154806 A1 | 6/2010 | Duffy |
| 2010/0258133 A1 | 10/2010 | Todd |
| 2010/0263669 A1 | 10/2010 | Bowsher |
| 2010/0274279 A1 | 10/2010 | Delmotte |
| 2011/0067700 A1 | 3/2011 | Spoo |
| 2011/0155138 A1 | 6/2011 | Lin |
| 2011/0180078 A1 | 7/2011 | McKinley |
| 2011/0249332 A1 | 10/2011 | Merrill |
| 2011/0255163 A1 | 10/2011 | Merrill |
| 2011/0255167 A1 | 10/2011 | Merrill |
| 2012/0000473 A1 | 1/2012 | Shigematsu |
| 2012/0012177 A1 | 1/2012 | Muduli |
| 2012/0039147 A1 | 2/2012 | Greter |
| 2012/0065607 A1 | 3/2012 | Cohen |
| 2012/0090615 A1 | 4/2012 | Chen |
| 2012/0091381 A1 | 4/2012 | Kern |
| 2012/0103339 A1 | 5/2012 | Koehler |
| 2012/0125341 A1 | 5/2012 | Gebrewold |
| 2012/0167890 A1 | 7/2012 | Insley |
| 2012/0167891 A1 | 7/2012 | Smaller |
| 2013/0094084 A1 | 4/2013 | Merrill |
| 2013/0094085 A1 | 4/2013 | Merrill |
| 2013/0094088 A1 | 4/2013 | Merrill |
| 2013/0095434 A1 | 4/2013 | Dunn |
| 2013/0095435 A1 | 4/2013 | Dunn |
| 2013/0100647 A1 | 4/2013 | Sherman |
| 2013/0170034 A1 | 7/2013 | Merrill |
| 2013/0186414 A1 | 7/2013 | Suzuki |
| 2013/0199535 A1 | 8/2013 | Dhuper |
| 2014/0034059 A1 | 2/2014 | Yagi |
| 2014/0135668 A1 | 5/2014 | Belalcazar |
| 2014/0182593 A1 | 7/2014 | Duffy |
| 2014/0182599 A1 | 7/2014 | Duffy |
| 2014/0202469 A1 | 7/2014 | Smaller |
| 2014/0326245 A1 | 11/2014 | Teng |
| 2014/0326255 A1 | 11/2014 | Teng |
| 2015/0047574 A1 | 2/2015 | Jakubowski |
| 2015/0059773 A1 | 3/2015 | Duffy |
| 2015/0101617 A1 | 4/2015 | Duffy |
| 2015/0238718 A1 | 8/2015 | Schnell |
| 2015/0328421 A1 | 11/2015 | Stephenson |
| 2017/0120206 A1 | 5/2017 | Hiemer |
| 2017/0031161 A1 | 11/2017 | Henderson |
| 2017/0318875 A1 | 11/2017 | Henderson |
| 2017/0340031 A1 | 11/2017 | Henderson |
| 2018/0104014 A1 | 4/2018 | Heindl |
| 2018/0154195 A1 | 6/2018 | Henderson |
| 2018/0272161 A1 | 9/2018 | Henderson |
| 2018/0368494 A1 | 12/2018 | Henderson |
| 2019/0184126 A1 | 6/2019 | Todd |
| 2021/0015184 A1 | 1/2021 | Facer |
| 2021/0113859 A1 | 4/2021 | Martin |
| 2021/0331008 A1 | 10/2021 | Duffy |

FOREIGN PATENT DOCUMENTS

| | | |
|---|---|---|
| CN | 201543133 | 11/2009 |
| CN | 201550643 | 8/2010 |
| CN | 201551752 | 8/2010 |
| CN | 101897484 | 12/2010 |
| CN | 201967734 | 9/2011 |
| CN | 102258930 | 11/2011 |
| CN | 202456521 | 10/2012 |
| CN | 202552239 | 11/2012 |
| CN | 202588368 | 12/2012 |
| CN | 202618364 | 12/2012 |
| CN | 104138728 | 11/2014 |
| EP | 0814871 | 1/2002 |
| EP | 0814871 B1 | 1/2002 |
| EP | 0 885 651 | 11/2002 |
| EP | 1417988 | 5/2004 |
| EP | 2070563 | 6/2009 |
| EP | 2142261 | 1/2010 |
| EP | 2486815 | 8/2012 |
| EP | 3 106 122 | 12/2016 |
| GB | 1351811 | 5/1974 |
| GB | 2072516 | 10/1981 |
| GB | 2329128 | 3/1999 |
| GB | 2433701 | 3/2010 |
| JP | 8332239 | 12/1996 |
| JP | 3045995 | 8/1997 |
| JP | 9-239050 | 9/1997 |
| JP | 3072027 | 9/2000 |

(56) References Cited

FOREIGN PATENT DOCUMENTS

| | | |
|---|---|---|
| JP | 2001-000565 | 1/2001 |
| JP | 2001-161843 | 6/2001 |
| JP | 2001-204833 | 7/2001 |
| JP | 2002-325855 | 11/2002 |
| JP | 2003-047688 | 2/2003 |
| JP | 2003-236000 | 8/2003 |
| JP | 2003-265635 | 9/2003 |
| JP | 3101352 | 10/2003 |
| JP | 2004-173777 | 6/2004 |
| JP | 3101212 | 6/2004 |
| JP | 3622958 | 12/2004 |
| JP | 2005-013492 | 1/2005 |
| JP | 2005-034618 | 2/2005 |
| JP | 3108880 | 4/2005 |
| JP | 2005-348998 | 12/2005 |
| JP | 2006-314618 | 11/2006 |
| JP | 2006-320629 | 11/2006 |
| JP | 2007-54270 | 3/2007 |
| JP | 3 138 154 | 11/2007 |
| JP | 3167135 | 1/2011 |
| JP | 2011-092282 | 5/2011 |
| JP | 2012-232080 | 5/2011 |
| JP | 2014-200316 | 10/2014 |
| KR | 20-1989-0005113 | 11/1989 |
| KR | 20-0321107 | 7/2003 |
| KR | 20-0348888 | 4/2004 |
| KR | 10-0529000 | 11/2005 |
| KR | 20120012520 | 2/2012 |
| SU | 11567 | 9/1929 |
| TW | M435859 | 8/2012 |
| TW | M464196 | 11/2013 |
| WO | WO 1996-028216 | 9/1996 |
| WO | WO 97/32494 | 9/1997 |
| WO | WO 99/24119 | 5/1999 |
| WO | WO 00/48481 | 8/2000 |
| WO | WO 2000/48481 | 8/2000 |
| WO | WO 2001/30449 | 5/2001 |
| WO | WO 2001/58293 | 8/2001 |
| WO | WO 2003-011443 | 2/2003 |
| WO | WO 2004-028637 | 4/2004 |
| WO | WO 2007-024865 | 3/2007 |
| WO | WO 2007-058442 | 5/2007 |
| WO | WO 2008/010102 | 1/2008 |
| WO | WO 2008-085546 | 7/2008 |
| WO | WO 2008/137272 | 11/2008 |
| WO | Wo 2009/048748 | 4/2009 |
| WO | WO 2010/075340 | 7/2010 |
| WO | WO 2010/075357 | 7/2010 |
| WO | WO 2010/075363 | 7/2010 |
| WO | WO 2010/075373 | 7/2010 |
| WO | WO 2010/075383 | 7/2010 |
| WO | WO 2010-143319 | 12/2010 |
| WO | WO 2011-025094 | 3/2011 |
| WO | WO 2012/012177 | 1/2012 |
| WO | WO 2012-030798 | 3/2012 |
| WO | WO 2012-068091 | 5/2012 |
| WO | WO 2012/068091 | 5/2012 |
| WO | WO 2016-038371 | 3/2016 |
| WO | WO 2016/090067 | 6/2016 |
| WO | WO 2016/090072 | 6/2016 |
| WO | WO 2016/090082 | 6/2016 |

OTHER PUBLICATIONS

Davies, The Separation of Airborne Dust and Particles, Proceedings of the Institution of Mechanical Engineers, Part B: Journal of Engineering Manufacture, vol. 1, No. 1-12, Jan. 1953, pp. 185-213.
"20 Pack NIOSH N95 Respirator", Menards, [retrieved from the internet on Jun. 29, 2017], URL <http://www.menards.com/main/paint/drop-cloths-plastic-sheeting/protective-wear/respiratory-protection/20-pack-nioshe-n95-respirator/p-2006906-c-13847.htm> pp. 1-2.
Galemed Oxi.Plust™ Oxygen Mask [retrieved from internet on Jul. 24, 2017] http://www.medicalexpo.com/prod/galemed-corporation/product-68550-774148.html#product-item_510581.
"Honeywell SAF-T-FIT Plus Disp. N95 Particulate Respirator Boomerang Nose Seal—Molded Cup-Valve-OV", [retrieved from the internet on Jul. 18, 2017], URL<http://www.fullsource.com/honeywell-n1125ov/>, 3 pgs.
External definition, Merriam Webster Online Dictionary, definition 1, https://www.merriam-webster.com/dictionary/external (Year 2020).
Interior definition, Merriam Webster Online Dictionary, definition 1, https://www.merriam-webster.com/dictionary/interior (Year 2020).
"Respiratory Safety", Protective Industrial Products, [retrieved from the internet on Jun. 29, 2017], URL <http://www.pipusa.com/en/products/?scID=2566&ccID=11571&sID=27955&ssID=79604&pID=47677>, p. 1.
Wente, "Manufacture of Superfine Organic Fibers", Report No. 4364 of the Naval Research Laboratories, May 1954, 21 pages.
Wente, "Superfine Thermoplastic Fibers", Industrial Engineering Chemistry, 1956, vol. 48, No. 8, pp. 1342-1346.

* cited by examiner

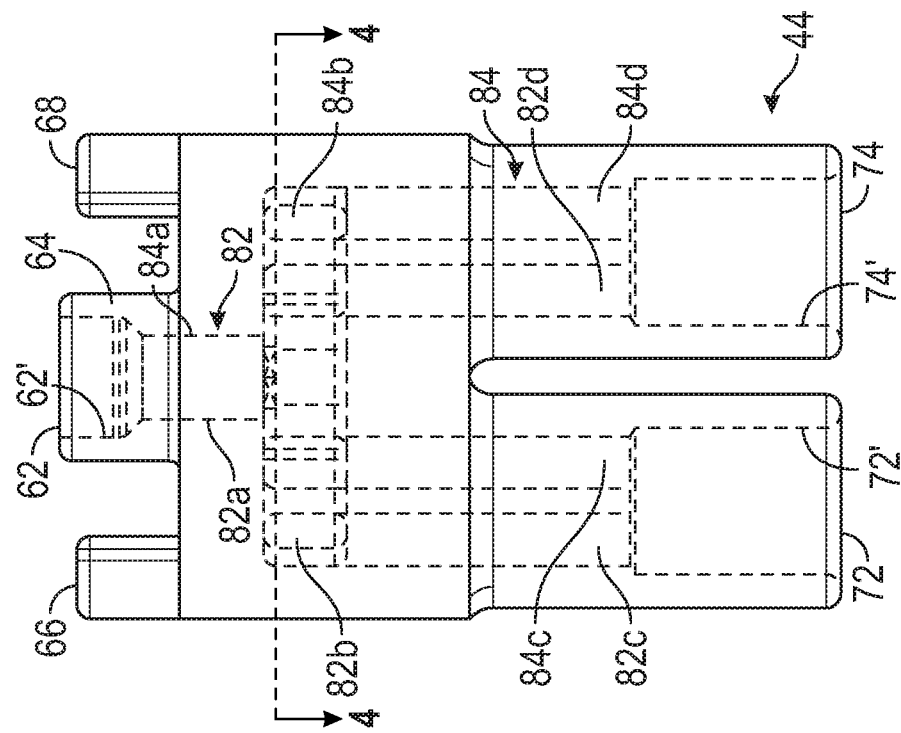
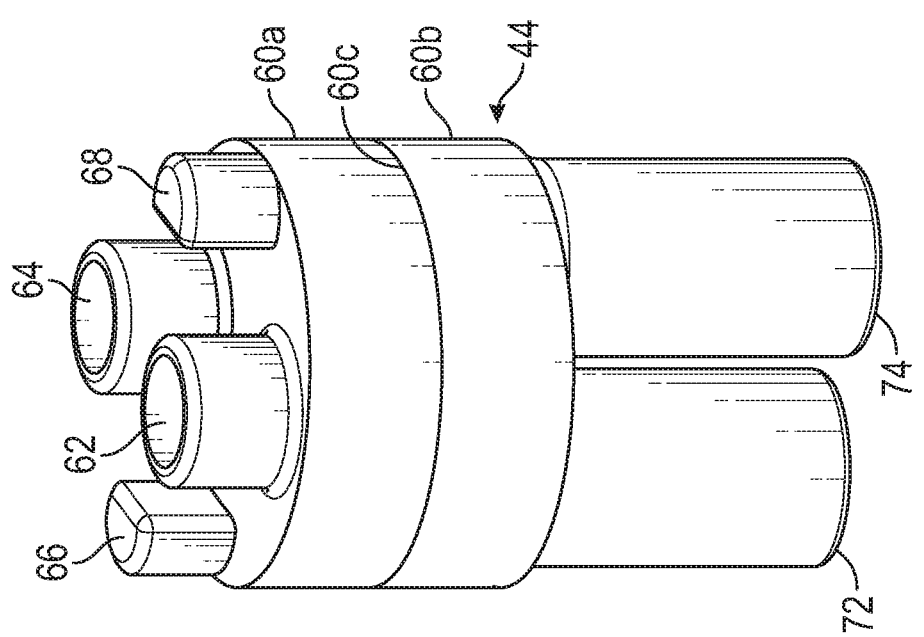

METHOD AND ADAPTER FOR CONVEYING PLURAL LIQUID STREAMS

CROSS REFERENCE TO RELATED APPLICATIONS

This application is a national stage filing under 35 U.S.C. 371 of PCT/IB2018/055019, filed Jul. 6, 2018, which claims the benefit of U.S. Provisional Application No. 62/532,391, filed Jul. 14, 2017, the disclosure of which is incorporated by reference in its/their entirety herein.

FIELD

The present disclosure relates generally to the conveying of plural liquid streams, and more particularly to an adapter to convey reactive liquids between a plural source and a static mixer.

BACKGROUND

Certain industrial and commercial processes involve the mixing and delivery of a reactive mixture formed from a first and second composition, e.g., an adhesive formed from an epoxy resin and a curing agent. In one often seen configuration, a dual cartridge syringe is mated to a static mixing and application nozzle. When the first and second compositions are dispensed from the dual cartridge syringe, their passage through the static mixer ensures an adequate mixing and a substantially complete reaction after the mixture leaves the static mixer, to be applied to a work piece.

A disadvantage of such an arrangement is that the reaction is continually occurring during transit of the first and second compositions through the static mixer. If the fluid flow stops between dispensing events, as may occur for example if a worker takes a brake while applying a two-part epoxy, the reaction between the two compositions does not stop. If the interval between the dispensing of mixed reactants is prolonged, the reaction will run to completion. Since many such compositions undergo a hardening reaction, this will ruin the static mixer and require its replacement. To avoid this problem, sometimes when the interval between the dispensing of mixed reactants is prolonged, applicators will use a setup that continuously runs a purge flow of the compositions. However, this usually wastes the compositions comprising the purge flow.

SUMMARY

The present disclosure provides an adapter that can be positioned between a dual fluid source such, and a static mixer. The adapter accomplishes some degree of flow splitting before delivering flows that are isolated from each other to the static mixer. This preliminary splitting allows in some embodiments the static mixer to have a lower volume and/or fewer mixing elements and still mix adequately. This gives the benefit that the amount of purge flow required to keep the mixer viable is also much smaller.

In one aspect, the present disclosure provides a flow splitting device comprising: a body having at least a first and a second inlet port and at least a first and a second outlet port, wherein a first flow passage provides fluid communication between the first inlet port and both the first and a second outlet ports, and wherein a second flow passage provides fluid communication between the second inlet port and both the first and a second outlet ports. In many convenient embodiments, the first flow passage and the second flow passage enter both the first outlet port and the second outlet port isolated from each other. Also, in many convenient embodiments the body comprises a first and a second section, such that the first and a second inlet ports are in the first section, and such that the first and a second outlet ports are in the second section. Such an arrangement is particularly convenient when injection molding of the first and second sections is contemplated.

In a second aspect the present disclosure provides a system for the mixing and delivery of a reactive composition formed from a first and second composition, comprising: a first and a second supply for the first and second compositions, the first and a second supply having a first and second dispensing port respectively; a flow splitting adapter comprising: a body having at least a first and a second inlet ports, each inlet port corresponding with and in fluid communication with the at least two outlet ports, wherein the first and second inlet ports are adapted to mate with the first and second dispensing ports respectively; and a mixing nozzle adapted to separably mate with the first and second outlet ports.

LISTING OF EXEMPLARY EMBODIMENTS

Embodiment A

A flow splitting device comprising:
a body having at least a first and a second inlet port and at least a first and a second outlet port, wherein
a first flow passage provides fluid communication between the first inlet port and both the first and a second outlet ports, and wherein
a second flow passage provides fluid communication between the second inlet port and both the first and a second outlet ports.

Embodiment B

The flow adapter according to Embodiment A wherein the first flow passage and the second flow passage enter both the first outlet port and the second outlet port isolated from each other.

Embodiment C

The flow adapter according to Embodiments A or B wherein the body comprises a first and a second section, such that
the first and a second inlet ports are in the first section, and such that
the first and a second outlet ports are in the second section.

Embodiment D

A system for the mixing and delivery of a reactive composition formed from a first and second composition, comprising:
a first and a second supply for the first and second compositions, the first and a second supply, having a first and second dispensing port respectively;
a flow splitting adapter comprising:
a body having at least a first and a second inlet ports, each inlet port corresponding with and in fluid communication with at least two outlet ports, wherein the first and second inlet ports are adapted to mate with the first and second dispensing ports respectively; and a static mixer adapted to separably mate with the first and second outlet ports.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which:

FIG. 2 is a perspective view of an embodiment of the flow splitting adapter of FIG. 1.

FIG. 3 is a side view similar to FIG. 2, with hidden lines of internal structures revealed.

Figure 1:
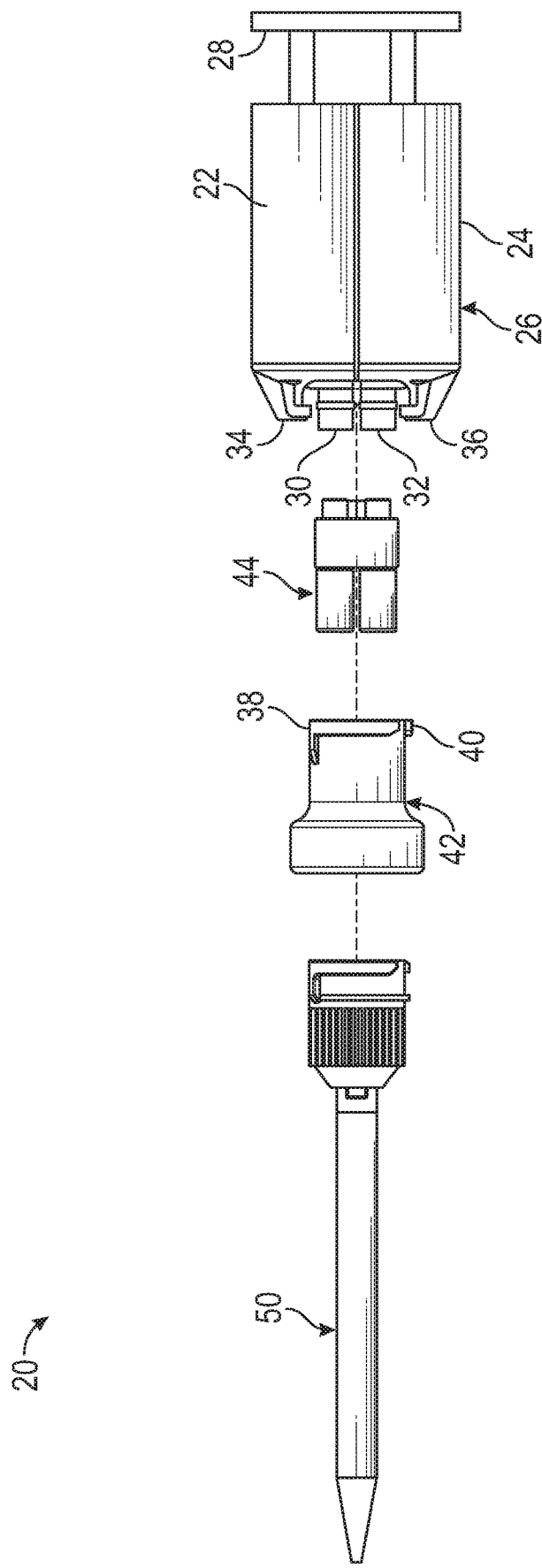
FIG. 1 is a plan exploded view of a system for the mixing and delivery of a reactive composition according to the present disclosure.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should understood that, as used herein:

The terms "(co)polymer" or "(co)polymers" includes homopolymers and copolymers, as well as homopolymers or copolymers that may be formed in a miscible blend, e.g., by coextrusion or by reaction, including, e.g., transesterification. The term "copolymer" includes random, block and star (e.g., dendritic) copolymers.

The term "adjoining" with reference to a particular layer means joined with or attached to another layer, in a position wherein the two layers are either next to (i.e., adjacent to) and directly contacting each other, or contiguous with each other but not in direct contact (i.e., there are one or more additional layers intervening between the layers).

By using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture.

The terms "about" or "approximately" with reference to a numerical value or a shape means+/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g., visible light) than it fails to transmit (e.g., absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended exemplary embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g., 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

Exemplary Apparatus and Processes

Various exemplary embodiments of the disclosure will now be described with particular reference to the Drawings.

Referring now to FIG. 1, a plan exploded view of system 20 for the mixing and delivery of a reactive composition according to the present disclosure is illustrated. The system 20 includes a first 22 and a second supply 24 for first and second compositions. In the illustrated embodiment, these supplies are integrated into a dual syringe 26. In this embodiment, the first and second compositions are impelled from the first 22 and a second supply 24 by the action of a dual plunger 28, although other expedients for accomplishing this action will be known to the routine practitioner. The first 22 and the second supply 24 have a first 30 and second dispensing port 32, respectively. In this embodiment, dual syringe 26 has a first 34 and a second 36 locking projection. These serve to interact with locking flanges 38 and 40 on connector 42 to provide a releasable attachment. Connector 42 in turn can releasably connect with a static mixer 50. Connector 42 is shaped internally to receive flow splitting adapter 44 and to hold it in fluid communication with dual syringe 26 and static mixer 50, as will be described with more particularity in connection with FIG. 2 below.

Referring now to FIG. 2, a perspective view of an alternate embodiment of a flow splitting adapter 44 is illustrated. Flow splitting adapter 44 includes a body having a first portion 60a and a second portion 60b, conveniently joined at parting line 60c. First portion 60a includes a first inlet port 62 and a second inlet port 64. In the illustrated embodiment, first portion 60a includes studs 66 and 68 to index and/or interlock with, e.g., a dual syringe. Second portion 60b includes a first outlet port 72 and a second inlet port 74, which can interface with a static mixer such as seen in FIG. 1.

Flow splitting adapter 44 is comprised in one embodiment of a suitable polymer material, metal, ceramic, or some hybrid combination thereof. In one embodiment, it may be manufactured by additive manufacturing processes, also known as 3D printing. Depending on the design of the flow splitting adapter, it may also be made by way of injection molding, using thermoplastics, thermosets, photocured polymers, metals, etc). Alternatively, the flow splitting adapter may be injection molded over a material that is later dissolved out. Or it could be fabricated as sub-assemblies and then those sub-assemblies joined together by a suitable method (e.g. by adhesive, welding, pressure, mechanical coupling, laser welding, etc.). Additionally, manufacture of the flow splitting adapter may employ 3D sintering or selective laser sintering. In one embodiment, the process of making a flow splitting adapter as described herein comprises: using an additive manufacturing process to build up a body having at least a first and a second inlet port and at least a first and a second outlet port, wherein a first flow passage provides fluid communication between the first inlet port and both the first and a second outlet ports, and wherein a second flow passage provides fluid communication between the second inlet port and both the first and a second outlet ports.

Referring now to FIG. 3, is side view of the flow splitting adapter 44 of FIG. 2 is illustrated, only with hidden lines of internal structures revealed. In the illustrated embodiment, first inlet 62 has tapered walls 62' to conveniently form a taper seal with, e.g., a dual syringe. A first flow passage 82 provides fluid communication between the first inlet port 62 and both first outlet port 72 and a second outlet port 74. First flow passage 82 conveniently includes four sections. First section 82a conveys fluid from first inlet 62 to a second section 82b. Second section 82b is a manifold dividing the flow and delivering it to third and fourth sections 82c and 82d. Third and fourth sections 82c and 82d, are in fluid communication with outlet ports 72 and 74 respectively. In the illustrated embodiment, first and second outlets 72 and 74 have tapered walls 72' and 74' respectively, to conveniently form a taper seal with, e.g., a static mixer.

A second flow passage 84 provides fluid communication between the second inlet port 64 (hidden on the far side of first inlet port 62 in this view) and both first outlet port 72 and a second outlet port 74. Second flow passage 84 conveniently includes four sections. First section 84a (hidden on the far side of first section 82a in this view) conveys fluid from first inlet 64 to a second section 84b. Second section 84b is a manifold dividing the flow and delivering it to third and fourth sections 84c and 84d. Third and fourth sections 84c and 84d, are in fluid communication with outlet ports 72 and 74 respectively.

Figure 4:
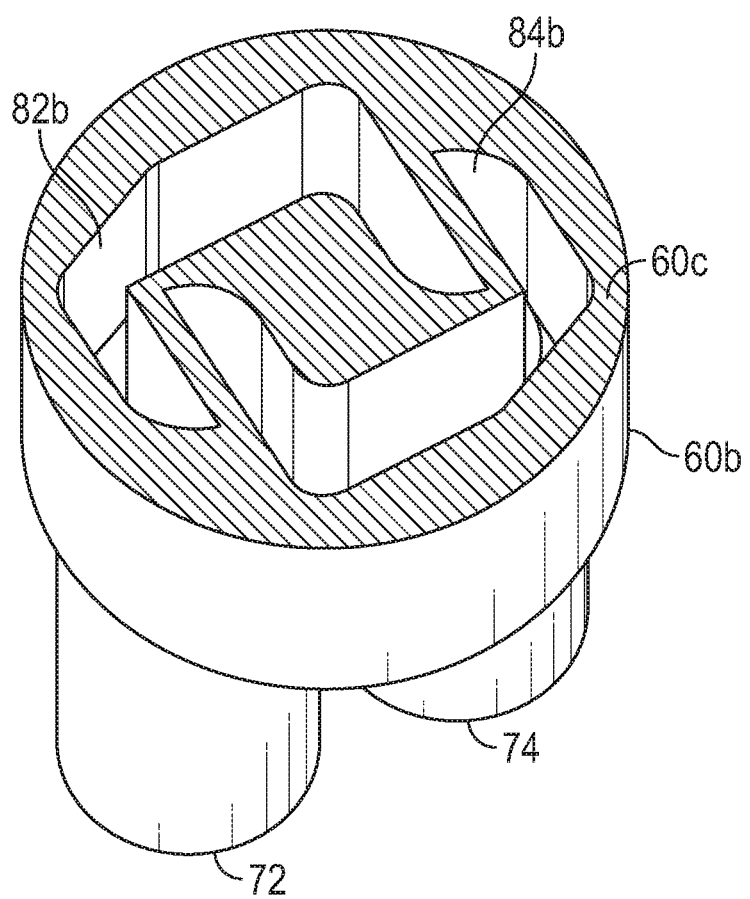
FIG. 4 is a perspective view of the second portion of the flow splitting adapter of FIG. 3, taken along section lines 4-4 in FIG. 3, and tilted.

Referring now to FIG. 4, a perspective view of the second portion 60b of flow splitting adapter 44 of FIG. 3, taken along section lines 4-4 in FIG. 3 and tilted slightly, is illustrated. In this view, the arrangement of second sections 82b and 84b are more conveniently visualized.

In the illustrated embodiment, as in many convenient embodiments, the fluid flows in third sections 82c and 84c are kept entirely separate until they release into a static mixer taper fit with first outlet port 72. Similarly, the fluid flows in fourth sections 82c and 84c are kept entirely separate until they release into a static mixer taper fit with first outlet port 74. This prevents any reaction between the two fluids from occurring within flow splitting adapter 44. Therefore even should the static mixer need replacing during a dispensing operation, the adapter will still be usable.

If additional pre-mixing should prove desirable, embodiments are possible where more than one flow passage originates at an inlet port, each destined to arrive separately at the same outlet port. It is still desirable that all flows remain isolated from each other when they end at their respective outlet ports.

The operation of certain exemplary embodiments of the present disclosure will be further described with regard to the following non-limiting detailed Examples. These Examples are offered to further illustrate the various specific and preferred embodiments and techniques. It should be understood, however, that many variations and modifications may be made while remaining within the scope of the present disclosure.

EXAMPLES

The following Examples are merely for illustrative purposes and are not meant to be overly limiting on the scope of the appended claims.

Example 1

An apparatus generally as depicted in FIG. 2 was assembled. The flow splitting adapter was fabricated using conventional additive manufacturing techniques. A dual syringe filled with a two-part epoxy adhesive, commercially available as DP405LH Black from 3M Company of St. Paul, Minn., was coupled to the inlet ports of the flow splitting adapter. A several lengths of T-mixer type static mixer commercially available as MIXPAC from Sulzer AG of Winterthur, CH was connected to the outlet ports of the flow splitting adapter in turn.

For each length of static mixer, a test was performed, dispensing the epoxy adhesive onto a metal plate while the backpressure on the plungers was measured. A control dispensing was similarly performed without the flow splitting adapter. Each metal plate was adhered to a similar plate before the adhesive was set, and a pull test of the shear strength of the bond was performed. The shear strength was taken as a proxy for the completeness of the mixing of the two parts of the two-part adhesive.

It was found that for a given dispensing rate, the back pressure was within only between about 5 to 10 percent for the test sample compared with its control. For any given length of static mixer, the shear strength of the bond was noticeably higher for the run with the flow mixing adapter than for its control. Alternatively, it could be said that a much smaller static mixer may be successfully employed for the same degree of cure when a flow splitting adapter according to the present disclosure is used.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

The invention claimed is:

1. A system for mixing and delivery of a reactive composition formed from at least a first composition and a second composition, comprising:
    a first supply and a second supply for the first composition and the second composition, the first supply and the second supply having a first dispensing port and a second dispensing port respectively;
    a flow splitting adapter comprising:
    a body having at least a first inlet port and a second inlet port, each inlet port corresponding with and in fluid communication with at least two outlet ports, wherein the first inlet port and the second inlet port are adapted to mate with the first dispensing port and the second dispensing port respectively; and
    a static mixer adapted to separably mate with the first dispensing port and the second dispensing port.

2. The system of claim 1, wherein the reactive composition comprises an epoxy.

\* \* \* \* \*